(12) United States Patent
Zenoni

(10) Patent No.: US 7,421,729 B2
(45) Date of Patent: Sep. 2, 2008

(54) GENERATION AND INSERTION OF INDICATORS USING AN ADDRESS SIGNAL APPLIED TO A DATABASE

(75) Inventor: Ian Zenoni, Highlands Ranch, CO (US)

(73) Assignee: Intellocity USA Inc., San Francisco, CA (US)

( * ) Notice: Subject to any disclaimer, the term of this patent is extended or adjusted under 35 U.S.C. 154(b) by 1153 days.

(21) Appl. No.: 10/076,950

(22) Filed: Feb. 12, 2002

(65) Prior Publication Data

US 2002/0131511 A1  Sep. 19, 2002

Related U.S. Application Data

(63) Continuation of application No. 09/933,928, filed on Aug. 21, 2001.

(60) Provisional application No. 60/268,350, filed on Feb. 12, 2001, provisional application No. 60/227,890, filed on Aug. 25, 2000.

(51) Int. Cl.
*H04N 7/16* (2006.01)

(52) U.S. Cl. .................. 725/146; 725/145; 725/28; 725/115; 725/116; 375/240.26; 375/240.28

(58) Field of Classification Search ............ 725/32, 725/34, 28, 115, 116, 145, 146; 715/719, 715/723
See application file for complete search history.

(56) References Cited

U.S. PATENT DOCUMENTS 4,930,160 A   5/1990  Vogel .................... 380/23
5,068,733 A   11/1991 Bennett
5,099,322 A   3/1992  Gove (Continued)

FOREIGN PATENT DOCUMENTS

EP    0967804 A2   12/1999

(Continued)

OTHER PUBLICATIONS

ClearPlay "Enjoy the Show!" Press Release Dec. 10, 2001, "ClearPlay Launches Groundbreaking Movie Filtering," http://www.clearplay.com/10Dec2001.asp, 2 pages.

(Continued)

*Primary Examiner*—Christopher S Kelley
*Assistant Examiner*—Farzana E Hossain
(74) *Attorney, Agent, or Firm*—Schwegman, Lundberg, Woessner, P.A.

(57) ABSTRACT

Disclosed is a system for inserting indicators, such as tags and markers, in a video stream. The tags and markers can be inserted automatically using a database, or manually using an operator input station that supplies standard tags and markers for easy insertion. The information can be accessed with the database functioning as a look-up table, or using a comparator that compares a time code with stored table information. Also disclosed is the generation of supplemental video signals that can be combined with a video signal to provide supplemental information that varies on a regional basis. The present invention also discloses the use of indicators to access Internet web sites to generate enhanced video signals. The indicators can be transmitted by embedding them in the streaming video, in the video blanking interval, encoding them as a separate data PID or placing them on a back channel.

22 Claims, 11 Drawing Sheets

U.S. PATENT DOCUMENTS

| | | | | |
|---|---|---|---|---|
| 5,410,326 | A | 4/1995 | Goldstein | |
| 5,600,368 | A | 2/1997 | Matthews, III | |
| 5,614,940 | A | 3/1997 | Cobbley et al. | |
| 5,627,936 | A | 5/1997 | Prasad et al. | 386/96 |
| 5,638,113 | A * | 6/1997 | Lappington et al. | 725/141 |
| 5,652,615 | A | 7/1997 | Bryant et al. | |
| 5,661,516 | A | 8/1997 | Carles | |
| 5,664,046 | A | 9/1997 | Abecassis | 386/125 |
| 5,675,511 | A | 10/1997 | Prasad et al. | 364/514 |
| 5,715,014 | A | 2/1998 | Perkins et al. | 348/565 |
| 5,724,472 | A | 3/1998 | Abecassis | |
| 5,740,549 | A | 4/1998 | Reilly et al. | |
| 5,758,257 | A | 5/1998 | Herz et al. | |
| 5,765,164 | A | 6/1998 | Prasad et al. | 707/104 |
| 5,818,510 | A | 10/1998 | Cobbley et al. | |
| 5,859,662 | A | 1/1999 | Cragun et al. | |
| 5,861,881 | A | 1/1999 | Freeman et al. | |
| 5,874,985 | A * | 2/1999 | Matthews, III | 725/32 |
| 5,894,320 | A | 4/1999 | Vancelette | |
| 5,917,830 | A | 6/1999 | Chen et al. | |
| 5,995,091 | A | 11/1999 | Near et al. | 345/302 |
| 6,002,393 | A | 12/1999 | Hite et al. | |
| 6,002,443 | A | 12/1999 | Iggulden | 348/553 |
| 6,005,603 | A * | 12/1999 | Flavin | 725/32 |
| 6,020,882 | A | 2/2000 | Kinghorn et al. | |
| 6,029,045 | A | 2/2000 | Picco et al. | |
| 6,038,367 | A | 3/2000 | Abecassis | 386/46 |
| 6,065,042 | A * | 5/2000 | Reimer et al. | 709/203 |
| 6,091,886 | A | 7/2000 | Abecassis | 386/125 |
| 6,100,916 | A | 8/2000 | August et al. | 348/5.5 |
| 6,104,334 | A | 8/2000 | Allport | |
| 6,104,423 | A | 8/2000 | Elam | 348/5.5 |
| 6,125,259 | A * | 9/2000 | Perlman | 725/28 |
| 6,134,243 | A | 10/2000 | Jones et al. | 370/465 |
| 6,144,401 | A | 11/2000 | Casement et al. | 348/7 |
| 6,151,444 | A | 11/2000 | Abecassis | |
| 6,166,780 | A | 12/2000 | Bray | 348/632 |
| 6,175,718 | B1 | 1/2001 | Kim et al. | 455/6.2 |
| 6,195,090 | B1 | 2/2001 | Riggins, III | |
| 6,216,171 | B1 * | 4/2001 | Isono et al. | 709/250 |
| 6,216,263 | B1 | 4/2001 | Elam | 725/28 |
| 6,226,793 | B1 | 5/2001 | Kwoh | 725/28 |
| 6,229,546 | B1 | 5/2001 | Lancaster et al. | 345/419 |
| 6,263,500 | B1 | 7/2001 | Yoshida et al. | 725/25 |
| 6,269,216 | B1 | 7/2001 | Abecassis | |
| 6,292,805 | B1 | 9/2001 | Basso et al. | 707/104 |
| 6,314,568 | B1 | 11/2001 | Ochiai et al. | |
| 6,359,661 | B1 | 3/2002 | Nickum | |
| 6,363,380 | B1 | 3/2002 | Dimitrova | |
| 6,434,747 | B1 * | 8/2002 | Khoo et al. | 725/46 |
| 6,446,261 | B1 | 9/2002 | Rosser | |
| 6,483,547 | B1 | 11/2002 | Eyer | |
| 6,519,770 | B2 * | 2/2003 | Ford | 725/28 |
| 6,560,366 | B1 | 5/2003 | Wilkins | |
| 6,615,408 | B1 * | 9/2003 | Kaiser et al. | 725/112 |
| 6,675,384 | B1 * | 1/2004 | Block et al. | 725/28 |
| 6,675,388 | B1 | 1/2004 | Beckmann et al. | |
| 6,698,020 | B1 * | 2/2004 | Zigmond et al. | 725/34 |
| 6,880,171 | B1 | 4/2005 | Ahmad et al. | |
| 7,200,852 | B1 * | 4/2007 | Block | 725/28 |
| 7,254,175 | B2 * | 8/2007 | Hurst et al. | 375/240.01 |
| 7,284,064 | B1 * | 10/2007 | Connelly | 709/231 |
| 2001/0001160 | A1 * | 5/2001 | Shoff et al. | 725/51 |
| 2002/0065678 | A1 | 5/2002 | Peliotis et al. | |
| 2002/0120931 | A1 | 8/2002 | Huber et al. | |
| 2004/0268405 | A1 * | 12/2004 | Zigmond et al. | 725/112 |
| 2005/0028194 | A1 | 2/2005 | Elenbaas et al. | |
| 2005/0028217 | A1 * | 2/2005 | Marler et al. | 725/112 |
| 2005/0235318 | A1 * | 10/2005 | Grauch et al. | 725/46 |

FOREIGN PATENT DOCUMENTS

| | | |
|---|---|---|
| EP | 0967804 A3 | 11/2000 |
| EP | 1056273 A2 | 11/2000 |
| EP | 1056273 A3 | 11/2000 |
| WO | WO-96/25821 | 8/1996 |
| WO | WO-96/33572 | 10/1996 |
| WO | WO-96/37075 | 11/1996 |
| WO | WO 01/99416 A2 | 12/2001 |

OTHER PUBLICATIONS

ClearPlay "Enjoy the Show!" Webpage "Being a Very Cool Responsible Parent Just Got a Whole Lot Easier," http://www.clearplay.com/, 2 pages.

Jerry Cobb, CNBC, "Taking Violence Out of DVD Movies—System from ClearPlay Removes 'R' Content from DVDs," http://www.msnbc.com/news/857154asp?cpl=1, 3 pages.

Ladas and Parry International PCT search report for INTE.15WO01.

* cited by examiner

GENERATION AND INSERTION OF INDICATORS USING AN ADDRESS SIGNAL APPLIED TO A DATABASE

CROSS REFERENCE TO RELATED APPLICATIONS

This application claims the benefit from U.S. Provisional Application Ser. No. 60/227,890, entitled "iSelect Video", filed Aug. 25, 2000, by Peliotis, et al., and U.S. Nonprovisional application Ser. No. 09/933,928, entitled "iSelect Video", filed Aug. 21, 2001, by Peliotis, et al., and U.S. Provisional Application Ser. No. 60/268,350, entitled "Video Tags and Markers", filed Feb. 12, 2001, by Zenoni, all of which are specifically incorporated herein by reference for all that they disclose and teach.

BACKGROUND OF THE INVENTION a. Field of the Invention

The present invention pertains generally to video systems and more particularly to control of displayed video information.

b. Description of the Background

Currently, broadcast of video information provides very little information regarding the content of upcoming video segments. Typically, movies may provide rating information at the beginning of the movie or may provide a brief description of the content of the overall movie or show. In many instances, it would be advantageous to utilize more detailed information on a video-segment-by-video-segment basis rather than the generalized information that is currently provided on a program-by-program basis. Additionally, a need exists for being able to control local video broadcasts by generating combined video signals or enhanced video signals. Also, a need exists for inserting indicators, such as tags and markers, in video broadcasts at the end-user location, in both an automated and manual fashion.

SUMMARY OF THE INVENTION

The present invention overcomes the disadvantages and limitations of the prior art by providing a system and method in which video indicators, such as tags and markers, can be generated and inserted in a video signal at the end-user location, such as a set-top box or viewer's computer to utilize and or establish content information regarding video segments. The present invention provides for the generation and insertion of content identification tags that provide information regarding upcoming video segments and markers that indicate the beginning/end of video segments. Tags can include rating information, keywords that describe the content, other descriptive material describing the content of the video segment, graphic recognition of video images, player statistical information, triggers that automatically connect the system to a interactive web page overlay, alternative video source information, or any other information that may be useful in viewing or controlling the video signal. The video signal also includes video segment markers that indicate the beginning and ending of each video segment. These video segment markers are associated with the tags through a unique ID associated with each marker.

The present invention may therefore comprise a method of inserting an indicator into a video stream at the end-user location (at or upstream of the set-top box) comprising: generating a time code signal that corresponds to video signal address of the video stream; generating indicators at the end-user site and storing them in a database; accessing these indicators that are stored in the database in response to the time code signal at the video signal address; encoding the video stream with the indicators.

The present invention may also comprise a method of manually inserting indicators in a video stream comprising: displaying the video stream to an operator; delaying the video stream to generate a delayed video stream; displaying the delayed video stream to an operator; inserting indicators at desired locations in the delayed video stream based upon information viewed in the video stream.

The present invention may also comprise a method of automatically inserting indicators in a video stream comprising: splitting the video stream; delaying one portion of the video stream to generate a delayed video stream; analyzing the other portion of the video stream with a video recognition device; generating a content ID signal; generating segment division markers for the analyzed video stream; comparing the content ID signal to a database of standard content identification tags to assign labels to the recognized video content; resynchronizing the assigned tags and markers with the delayed video stream; encode the delayed video stream with the generated tags and markers data.

The present invention may also comprise a method of generating a combined video signal in response to an indicator encoded in a video stream comprising: extracting the indicator from the video stream; decoding the indicator to generate an access signal; using the access signal to access a supplemental video signal stored in a database; and combining the supplemental video signal with the video stream to generate the combined video signal.

The present invention may also comprise a system for generating a combined video signal in response to indicators provided in a video stream comprising: a decoder that is connected to receive the video stream and separates the indicators from the video stream to produce an indicator signal and a video signal; a database that stores supplemental video and generates a supplemental video signal in response to the indicator signal; and a video combiner that combines the video signal and the supplemental video signal to produce the combined video signal.

The present invention may also comprise a method of generating an enhanced video signal in response to an indicator encoded in a video stream comprising: extracting the indicator from the video stream; using the indicator to access an Internet web site and producing a web site signal; encoding the video stream with the web site signal; extracting the web site signal and a video stream from the video stream; decoding the web site signal to generate a supplemental video signal; and combining the supplemental video signal and the video signal to generate the enhanced video signal.

The present invention may also comprise a system for generating an enhanced video signal in response to indicators provided in a video stream comprising: a decoder that is connected to receive the video stream and that separates the indicators from the video stream; an Internet connection that accesses an Internet address in response to the indicators; an Internet information decoder that decodes Internet information accessed at the Internet address and that generates a supplemental video signal; and a combiner that combines the supplemental video signal and the video stream to generate the enhanced video signal.

An advantage of the present invention is that detailed information can be provided or created at the end-user location regarding a video signal on a video-segment-by-video-segment basis. This information, along with the beginning and ending points of each video segment, can be used in various ways in accordance with the present invention. For example, rating information regarding each video segment can be provided so that nonconforming portions can be eliminated if the rating of the video segment does not match the desired rating. Further, alternative video sources can be accessed if the content of the video signal does not correspond with selected content. A textual description can be provided in the tag that is compared with keywords inserted by the user to either select or exclude video segments. For example, if a viewer does not wish to view any information regarding the presidential election, an alternative video source can be provided such as the weather or an advertising banner. Further, local advertising information can be provided during video segments in interactive TV implementations. For example, if a large automobile manufacturer runs a national advertisement, tags can be used to automatically access a web page for a local dealer that provides advertising information such as vehicle and price information. Tags can also be used to indicate the beginning of a local advertising segment. For example, short advertising segments can be inserted after national advertisements for local dealers in the same fashion as alternative video sources are inserted in a video stream. Also, combined video signals can be generated in the form of a segmented screen or overlays that can provide a wide variety of information.

Tags can be inserted in an automated fashion using a database device or in a real-time or near real-time (delayed) fashion in accordance with the present invention. The present invention is capable of providing the tags and markers in a video stream in a simple and easy fashion and provides a format by which these tags and markers can be used to generate control signals to control the video signal in a variety of different ways. For example, the tags and markers can be implemented in XML language to provide a simple and easy manner of generating control signals. Of course, any desired format can be used for implementing the tags and markers.

Incoming video signals can therefore also be analyzed and screened in a real-time or near real-time (delayed) fashion in accordance with the present invention. Audio and video recognition of incoming signals that do not contain or do not have adequate identifying tags or markers can be supplied with these markers at the end-user site. These tags and markers can then be used to either select or exclude video segments. For example, if a viewer does not wish to view any nudity or offensive language, an alternative video source can be provided such as the weather or an advertising banner. In a similar fashion, audio signals can be blanked or supplemented when certain offensive or unwanted speech or sound is recognized, tagged and marked.

DETAILED DESCRIPTION OF THE PREFERRED EMBODIMENT OF THE INVENTION

Figure 1:
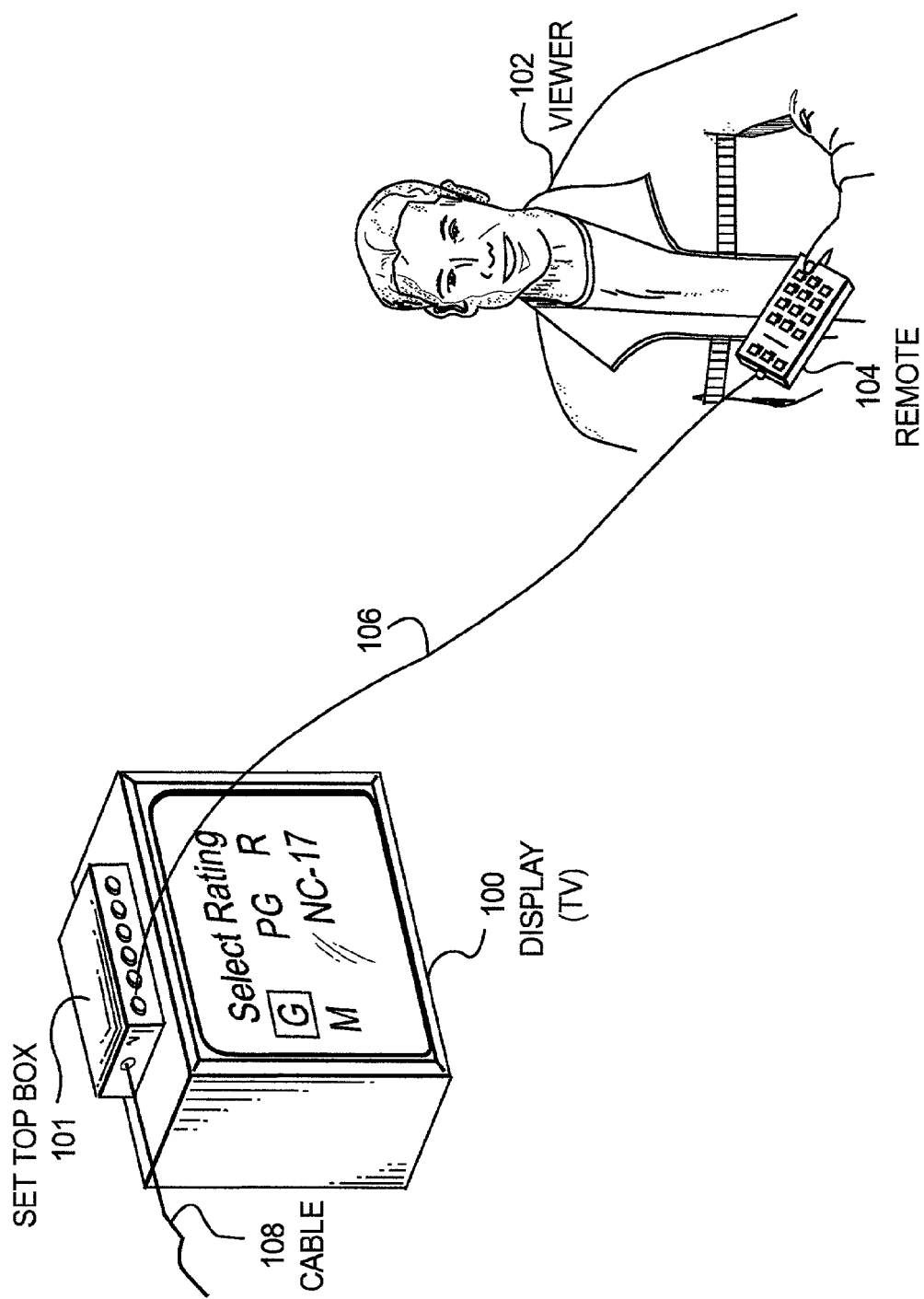
FIG. 1 is a schematic illustration of the manner in which a viewer can use the present invention.

FIG. 1 is a schematic illustration of the manner in which the present invention can be utilized. As shown in FIG. 1, a display device 100, such as a TV, or a set-top box 101 operate under the control of a remote control device 104 operated by a user 102. The remote control device 104 generates control signals 106 that control the operation of the display 100 or set-top box 101. In accordance with the present invention, the display device 100 or a set-top box 101 connected to the display device 100 is programmed to receive indicators, such as tags and markers, that are either supplied on the video input 108 together with the video stream or generated at the set-top box 101. The viewer 102 can utilize the remote control device 104 to make selections displayed on the display device 100 or set-top box 101 that are entered into and stored as user preferences, such as disclosed in the above referenced U.S. Provisional Patent Application Ser. No. 60/227,890, filed on Aug. 25, 2000 and U.S. Nonprovisional patent application Ser. No. 09/933,928, filed Aug. 21, 2001, both entitled "iSelect Video," which is specifically incorporated herein by reference for all that it discloses and teaches. For example, as illustrated in FIG. 1, the user can select a variety of desired filtering criteria and preferences such as rating, nudity, violence, offensive language, graphic content, subject content, etc., for the video segments that the viewer will view during a particular video broadcast. Tags and markers can be used to trigger the display of the selected information that can appear on the display screen as an overlay or on partitioned portions of the screen that does not block the view of the video signal. The displayed information can be generated through the generation of a combined video signal or as an enhanced broadcast, as more fully disclosed below.

Figure 2:
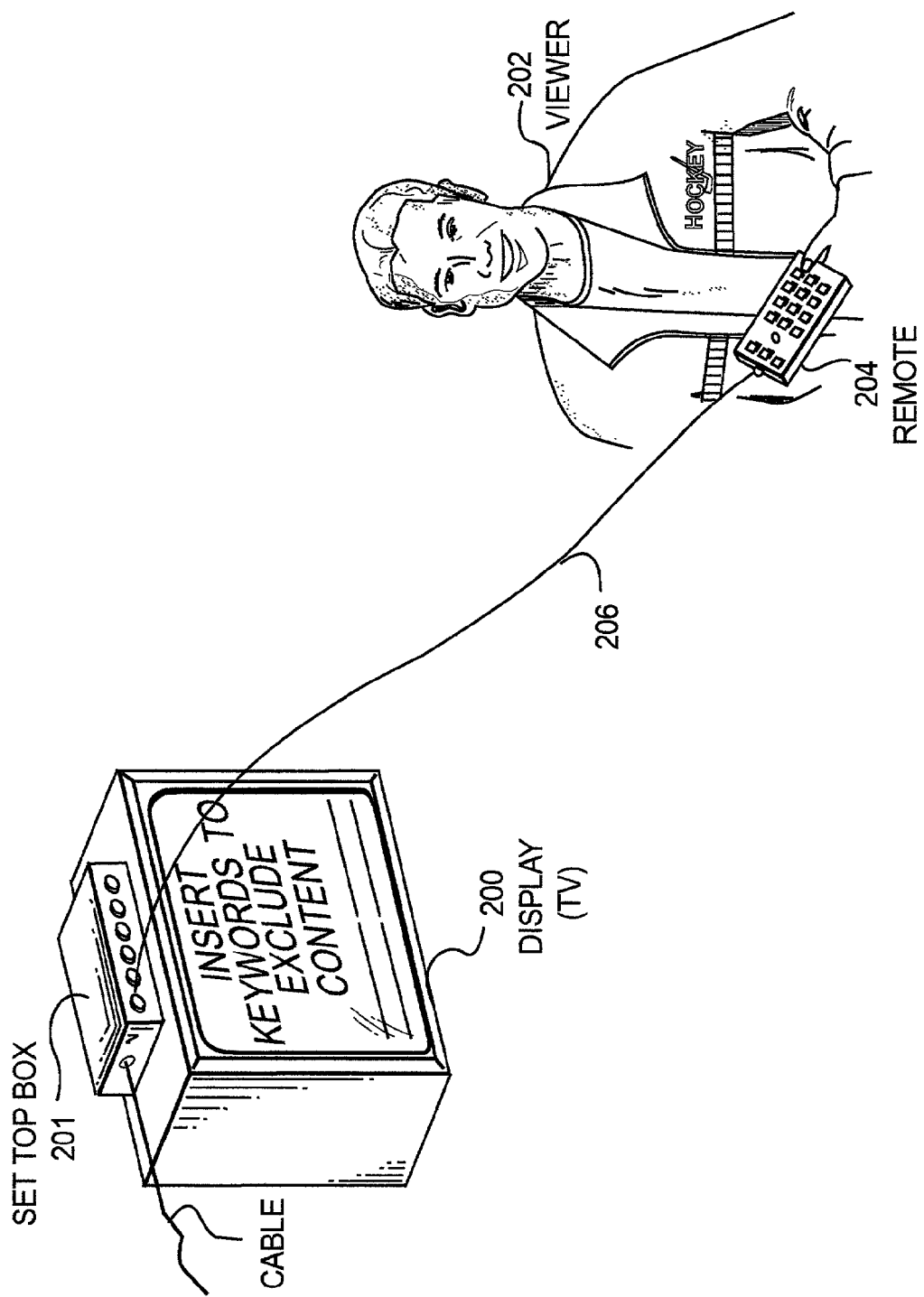
FIG. 2 is a schematic illustration of another way in which a viewer can use the present invention.

FIG. 2 is a schematic illustration of a similar system. As shown in FIG. 2, a display device 200 is under the control of a remote control device 204 that is operated by a viewer 202. The remote control device generates control signals 206 that are received by the display 200, or a set-top box 201 that is connected to the display device 200. As shown in FIG. 2, different types of control information are displayed on the display 200. For example, tags and markers in the video feed 208 or generated by the set-top box 201, may prompt the display to generate display information indicating content that the viewer wishes to exclude during the broadcast of a particular show. For instance, the viewer may wish to exclude information regarding a presidential election, a particular tragedy that has occurred, etc. Keywords or video recognition parameters can then be entered in response to the display prompt which are stored as viewer preferences and implemented by a filter, such as disclosed in the above-referenced U.S. Provisional Patent Application Ser. No. 60/227,890, filed on Aug. 25, 2000 and U.S. Nonprovisional patent application Ser. No. 09/933,928, filed Aug. 21, 2001, both entitled "iSelect Video", to exclude such information. Key words or video recognition parameters can also be used to select and filter or enhance information from one or more broadcast channels.

Figure 3:
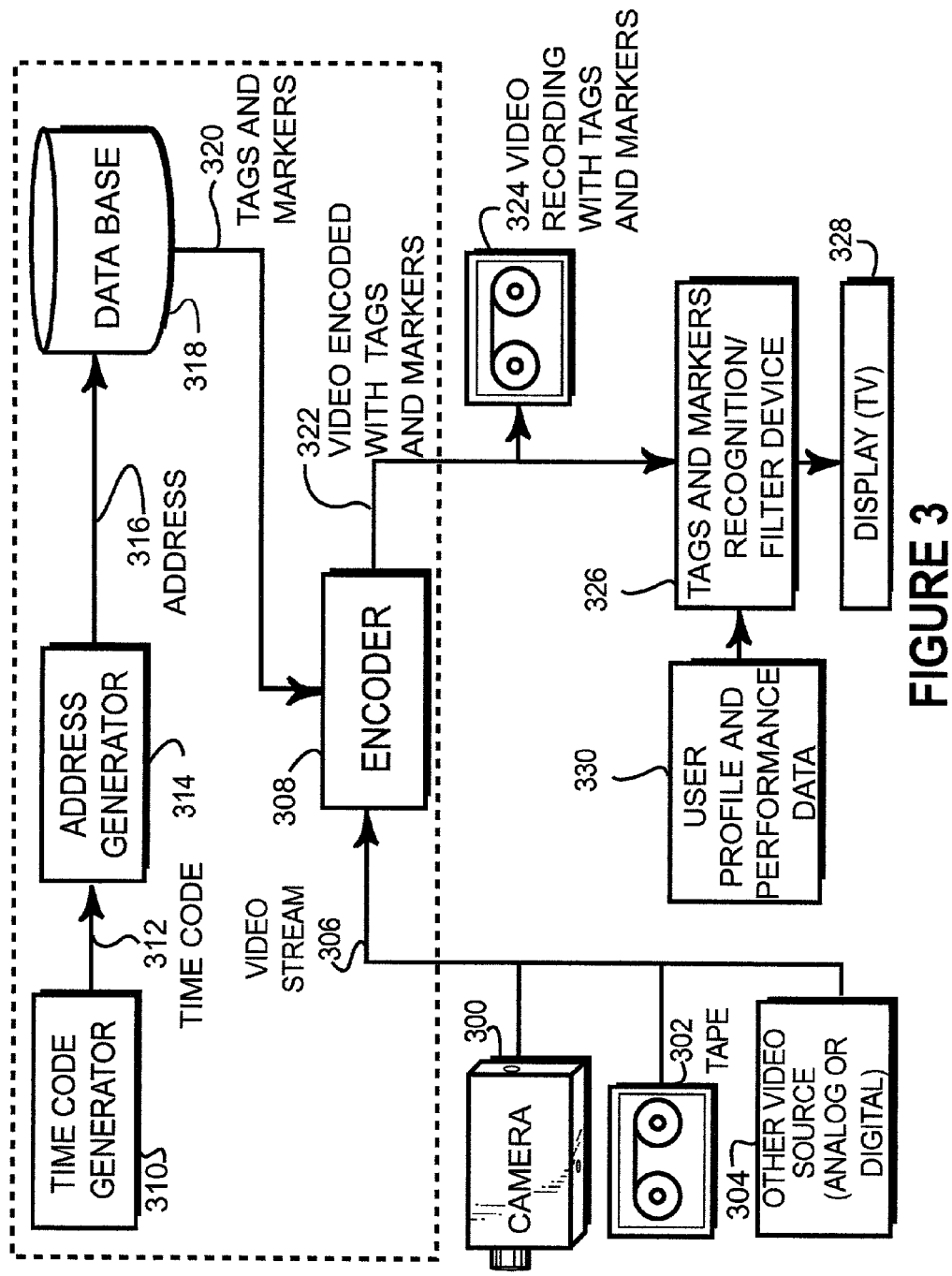
FIG. 3 is a schematic block diagram illustrating one implementation for automatically inserting indicators in accordance with the present invention.

FIG. 3 is a schematic block diagram illustrating the manner in which indicators, such as tags and markers, can be inserted in a video stream in an automated fashion. As shown in FIG. 3, a variety of video sources can generate a video stream 306. For example, the video stream 306 can be generated by a video camera 300, a video tape player 302, or any other type of video source 304, such as a DVD player, a satellite downlink, cable system, microwave signal, etc. In accordance with the present invention, tags and markers are inserted into the video stream 306 which is not encoded with any time code data. The video stream 306 is then applied to an encoder 308. A time code generator 310 generates a time code 312 that is synchronized with the video stream 306 and provides a numerical indication of the position of the video stream 306 that is being applied to the encoder 308 with respect to the entire video broadcast, such as a particular video show. The time code 312 is applied to an address generator 314 that decodes the time code and generates a corresponding address signal 316. The corresponding address signal 316 is applied to a database 318. The database 318 functions in a manner similar to a look-up table. The database 318 receives the address signals and produces an output 320 which corresponds to the information that is stored at a particular address 316 that is applied to the database 318. For example, the address generator 314 may generate a series of sequential addresses in response to the time code 312.

Referring again to FIG. 3, the tags and markers can be stored at selected addresses within the database device 318 that correspond to the locations at which those tags and markers may be accessed during the sequence of the video stream. For example, it may be desirable to insert a marker at the beginning/end of each video segment to signify the beginning/end of that segment. Further, it may be desirable to provide tags that describe the content of an upcoming video segment by inserting that tag at some time previous to the marker indicating the beginning of that video segment. Other types of information can also be inserted, such as triggers to signal the generation of an enhanced video signal to its subscribers at particular times during a broadcast, or to signal other services within the set-top box to access an Internet web address during a particular video segment, such as an advertisement or an interactive game to be played during a video broadcast, etc. Also, indicators can be used to generate control signals for producing a combined video signal, as explained more fully with respect to FIGS. 9 and 10. In fact, any type of control signal can be inserted as an indicator in the video stream for any desired purpose in accordance with the spirit of the present invention.

One implementation to describe a tag is a XML file such as provided below:

```
<Tag>
  <ID>3343</ID>
  <StartTime>12:45:00</StartTime>
  <EndTime>12:46:30</EndTime>
```

```
  <Rating>PG</Rating>
  <Rating>V</Rating>
  <Description>Riots erupt in Central Asia</Description>
  <Alt>lid:\\alternative\new\channel3\weather.html</Alt>
</Tag>
```

One implementation to describe a marker is a XML file such as provided below:

```
<Marker>
  <START/>
  <ID>3343</ID>
  <Alt>chanel:3</Alt>
</Marker>
<Marker>
  <END/>
  <ID>3343</ID>
</Marker>
```

Note that the marker has the same ID as the tag which links these two together.

Another implementation to describe the tags and markers could be an ASCII text string with defined fields and a check sum such as described below:

```
[Tag:3343] [StartTime:12.45.00] [EndTime:12.46.30] [Rating:PG]
[Rating:V] [Description:Riots erupt in Central Asia] [Alt:lid:
\\alternative\new\channel3\weather.html] [F4A2]
[Marker:Start] [ID:3343] [Alt: lid:\\alternative\new\channel3\ford.gif]
[CD21]
[Marker:End] [ID:3343] [31AF]
```

Other implementations to describe the tags and markers could include binary data, bit masking data or any other type data that describes the indicator.

Referring again to FIG. 3, the database 318 generates a series of tags and markers 320 in the manner described above. These tags and markers 320 are applied to the encoder 308 together with the video stream 306. The encoder 308 encodes the video stream 306 in one of several different ways to generate a video stream 322 that is encoded with the tags and markers. The video encoded with tags and markers 322 can then be applied to a recognition/filter device 326 where the user profile and preference data 330 is compared with the tags and markers data with the result being sent to a display (TV) 328 for real-time or near real-time viewing. The video stream 306 can also be output to a video recording device 324 to record the video 322 that has been encoding with the tags and markers for later use.

As mentioned above, there are several different ways in which the video can be encoded with the tags and markers. One method of encoding the video stream is to encode the tags and markers in the video blanking interval (VBI) of an analog video stream. This is done in accordance with standard VBI encoding techniques that are used for encoding data such as closed captioning, etc. Since line 21 of the vertical blanking interval is required to be passed down to the set-top box, a section of the closed captioning (T1, T2, T3 or T4) can be used. However, the information can also be provided during the horizontal blanking interval, if desired.

Another method of encoding the video stream 306 with the tags and markers is to encode the data in a back channel. In accordance with this method, a standard back channel frequency can be used to provide the indicator information in accordance with well-known back channel encoding techniques. Back channel encoding comprises the encoding of a separate frequency channel that allows for two-way transmission of data.

Another technique of encoding the tags and markers in the video stream 306 includes encoding the data directly in the video stream. Various techniques have been used for encoding data within a video MPEG stream, and any desired method can be utilized. A data PID (program identification) can be used to identify different portions of the data in the MPEG stream. For example, the MPEG stream may include video PIDs, audio PIDs, etc. In accordance with this manner of encoding, a data PID could be generated that would carry the tags and markers.

Another method of encoding the tags and markers in the video stream is to encode the data directly in the streaming media, such as through the use of a blank file that is embedded directly in the streaming media. Encoding the data in the streaming media can be done in accordance with Microsoft's ASF format.

Figure 4:
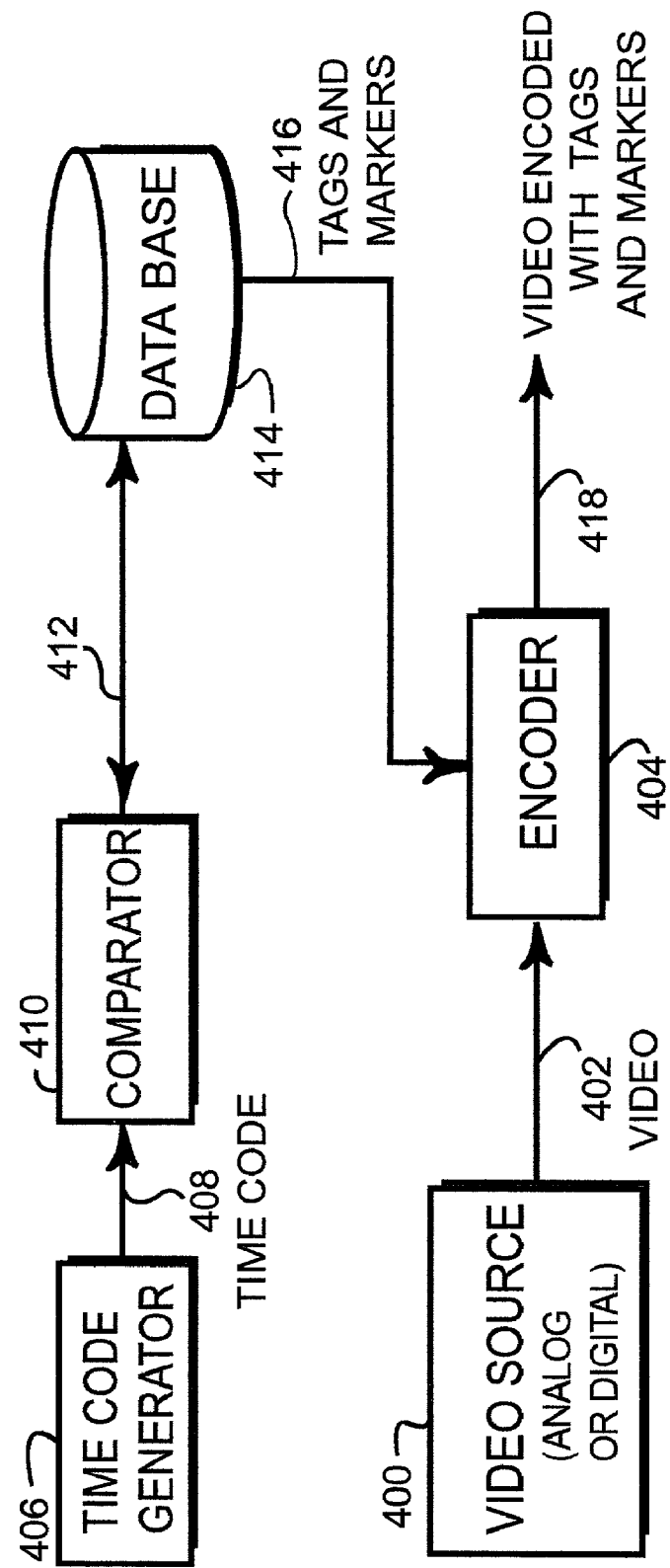
FIG. 4 is a schematic block diagram illustrating another implementation for automatically inserting indicators in accordance with the present invention.

FIG. 4 is a schematic illustration of another manner of automatically encoding data in a video stream. As shown in FIG. 4, a video source 400 provides a video stream 402 in a manner similar to that which is described in FIG. 3. In other words, a video stream can be provided from any type of video source or video transmission. The video signal 402 is applied to an encoder 404. As shown in FIG. 4, a time code generator 406 is used to generate a time code 408 that is synchronized with the video stream 402 and provides a numerical indication of the location of the video that is being applied to the encoder 404 within the entire video program. The time code is applied to a comparator 410. The comparator 410 accesses a table in database 414 via connection 412 that indicates the locations at which tags and markers are to be inserted in the video stream. The comparator 410 compares the table data with the time code data 408. When there is a favorable comparison of the time code 408 with the corresponding time code of the table, a corresponding database address is retrieved from the table. The address information is then applied by the comparator 410 to the database 414. A tag or marker 416 is then retrieved at the indicated address and applied to the encoder 404. The encoder 404 encodes the video signal 402 with the tags and markers that have been retrieved from the database 414 in one of the ways described above. The encoder therefore produces a video signal 418 that is encoded with the tags and markers at the locations indicated by the database table.

Figure 5:
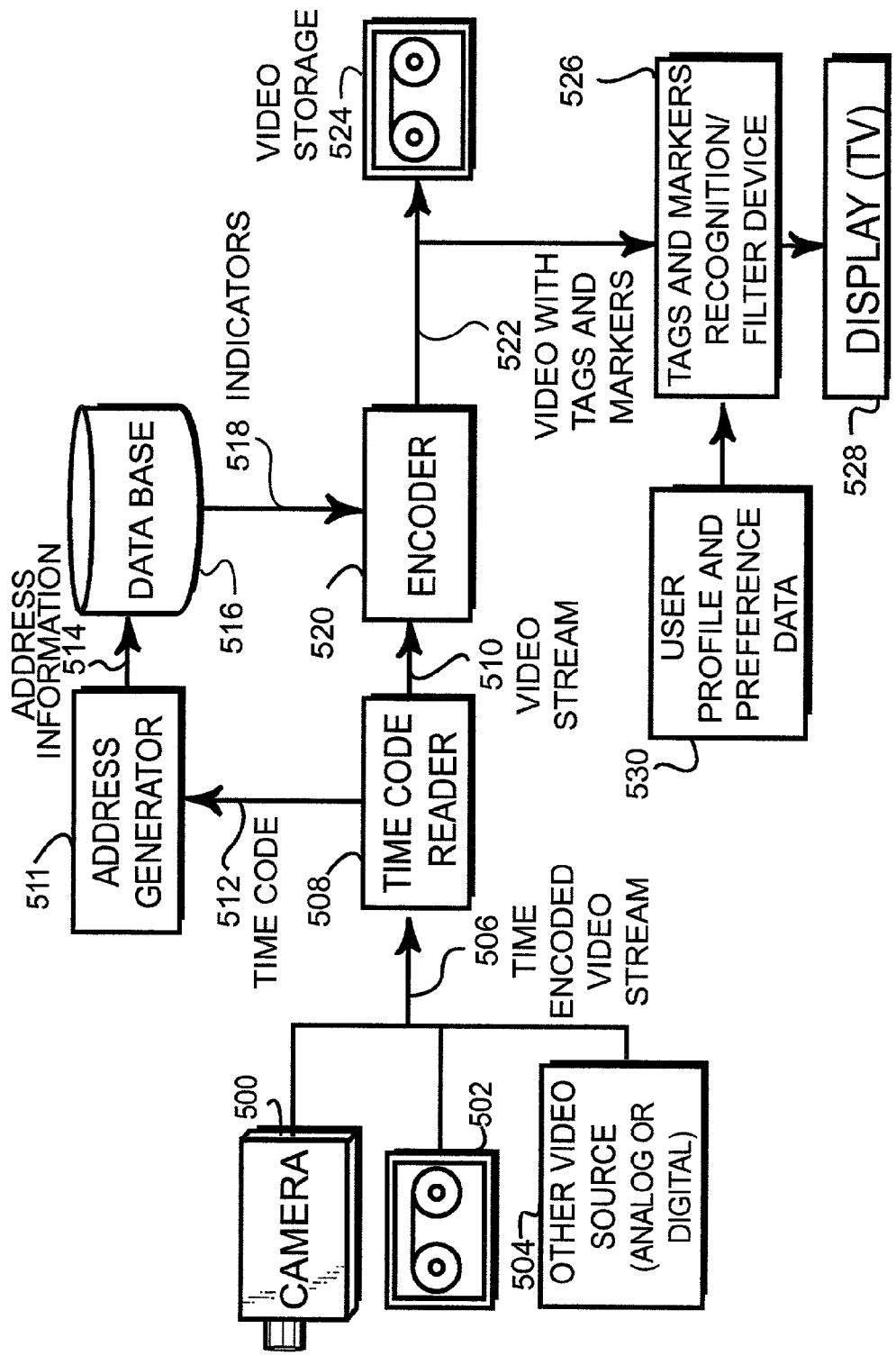
FIG. 5 is a schematic block diagram illustrating another implementation for automatically inserting indicators in accordance with the present invention.

FIG. 5 is a schematic block diagram illustrating the manner in which a time encoded video signal can be encoded with tags and markers. As shown in FIG. 5, a video signal can be generated from various types of video sources such as video camera 500, a video player 502, or any other type of video source 504. These sources may be capable of generating a video signal 506 that is encoded with a time code. The time code may be embedded in the video stream or may be provided as a separate channel. The time encoded video stream 506 is applied to a time code reader 508. The time code reader 508 is capable of reading the time code from the video signal and, as such, constitutes a time code decoder. The time code 512 that is extracted from the time encoded video signal 506 by the time code reader 508 is applied to an address generator 511. Address generator 511 generates an address signal 514 in response to the time code signal 512. The address information 514 is applied to the database 516 to access data stored in the database 516 at the address location corresponding to the address information 514. Database 516 stores tags and markers information (indicators) at various addresses that are accessed in response to the address information 514. The indicators 518 that have been accessed are applied to the encoder 520. In other words, the database 516 is programmed to include indicators at address locations that correspond to selected locations within the video stream that, in turn, correspond to the time code information that has been translated into addresses within the database. The encoder 520 encodes the indicators in the video stream 510 in one of the ways described above. The encoder therefore produces a video stream 522 that is encoded with tags and markers. The video stream 522 can then be applied to a recognition/filter device 526 where the user profile and preference data 530 is compared with the tags and markers data with the result being sent to a display (TV) 528 for real-time or near real-time viewing. The video stream 522 can also be output to a video recording device 524 to record the video 522 that has been encoding with the tags and markers for later use.

Figure 6:
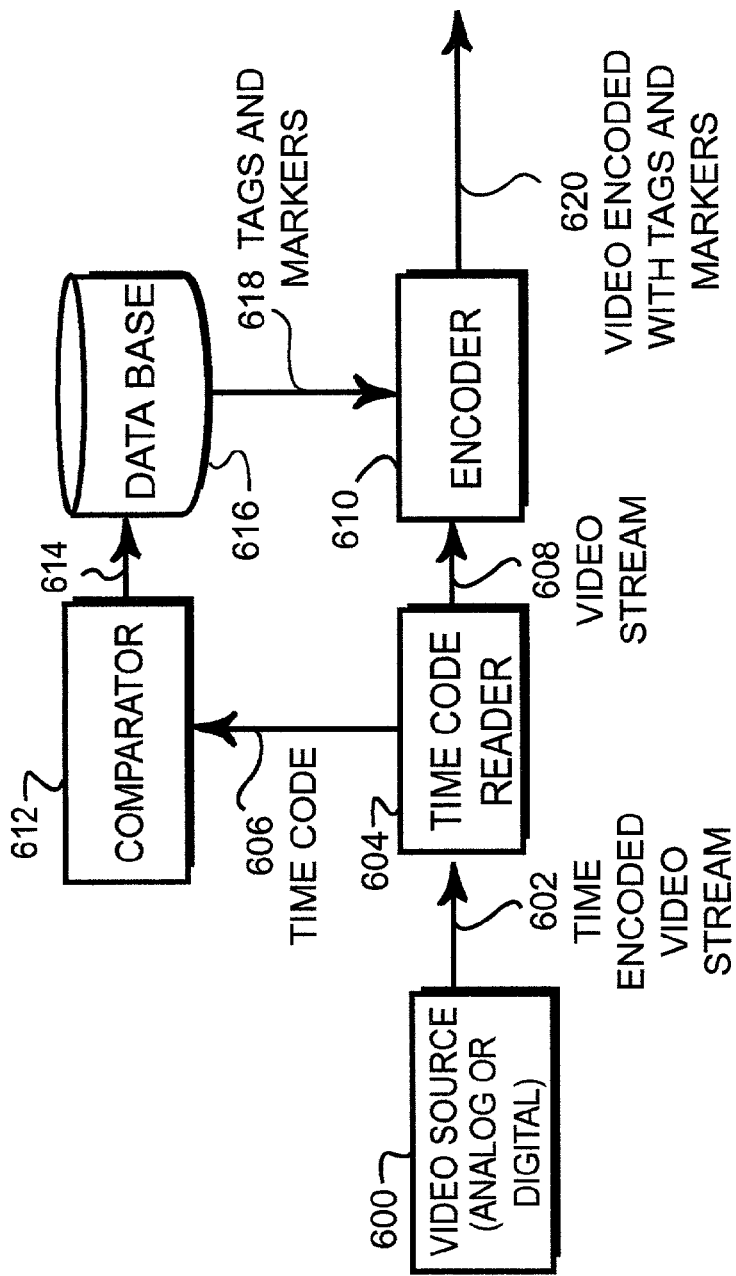
FIG. 6 is a schematic block diagram illustrating another implementation for automatically inserting indicators in accordance with the present invention.

FIG. 6 is a schematic block diagram that illustrates another method of encoding a time encoded video stream with indicators such as tags and markers. As shown in FIG. 6, a video source 600, which can comprise any desired video source, generates a time encoded video stream 602. The time encoded video 602 is applied to a time code reader 604 that reads the time code 606 from the time encoded video stream 602. The video stream 608 is applied to an encoder 610. The time code signal 606 is applied to a comparator 612. The comparator 612 accesses database 616 via connector 614 to access a table that includes time code listings and associated database addresses at which tags and markers are stored and that are to be inserted at the corresponding time code location in the video stream. Comparator 612 compares the time code signal 606 with the time codes of the table and retrieves a corresponding database address upon a favorable comparison. The database address is then accessed in the database 616 where a marker or tag is stored. A marker or tag 618 is then produced at the output of the database 616 and applied to the encoder 610. The encoder 610 encodes the video 608 with the tag or marker to generate a video stream 620 encoded with tags and markers.

Figure 7:
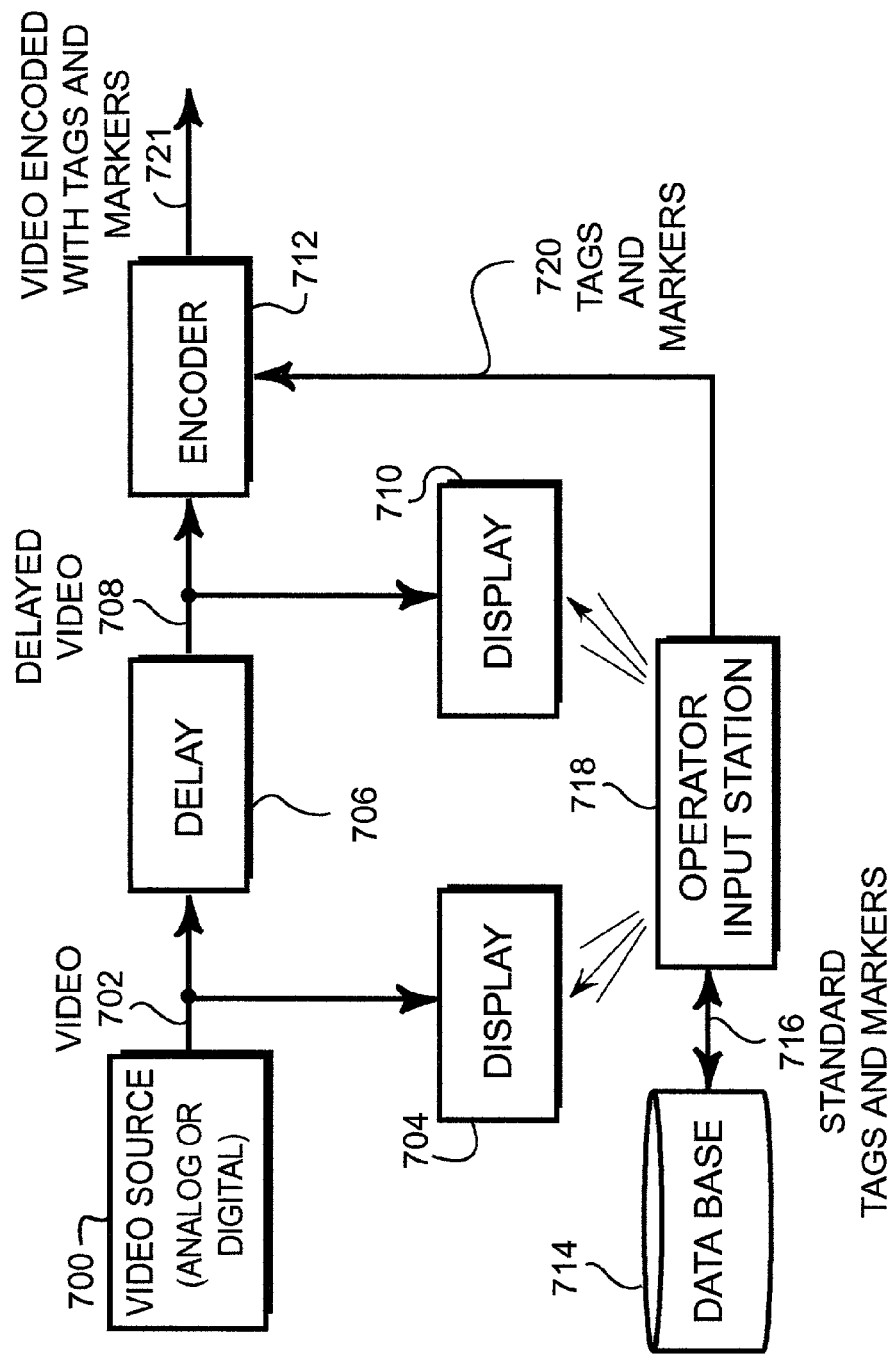
FIG. 7 is a schematic block diagram illustrating one implementation for manually inserting indicators in a delayed video signal.

FIG. 7 is a schematic block diagram illustrating the manner in which tags and markers can be inserted in a delayed video stream by an operator employing an operator input station. As shown in FIG. 7, a video source 700 produces a video signal 702 that is applied to a display 704 and a delay device 706. The display 704 is situated such that an operator positioned at an operator input station 718 can view the display 704 of the video 702. Delay device 706 delays the video signal 702 by a predetermined period which may constitute several seconds to produce a delayed video signal 708. The delayed video signal 708 is applied to another display 710 that is also situated such that an operator positioned at an operator input station 718 can view the display 710 showing the delayed video signal 708. The delayed video signal is also applied to an encoder 712.

As described above with regard to FIG. 7, an operator is positioned at an operator input station 718 so that the operator can view the video signal 702 on display 704 and the delayed video signal 708 on display 710. The operator views the video signal 702 over the display 704 and generates tags that may describe the content of the video segment that is being viewed by the operator over display 704. This is accomplished by the operator accessing standard tags 716 from the database 714. For example, the tag may indicate the rating of a particular video segment or some descriptive keywords that are provided by the database 714 as standard tags. The operator input station 718, under the control of the operator, applies these standard tags 720 to the encoder 712 as soon as they are made available by the operator input station 718. Since the video signal applied to the encoder 712 is delayed, the tags can preferably be inserted prior to the start of the video segment to which the tag refers. The operator can then view the delayed video signal 710 and determine the precise time at which a marker should be inserted in the delayed video stream 708 to indicate the end of a particular video segment and the beginning of the next video segment. Since the operator has already viewed the video segment on display 704 several seconds before the delayed video segment that is displayed on display 710, the operator is able to precisely position the marker at the intersection of video segments. The operator then generates the marker employing the operator input station 718 which is transmitted to the encoder 712. The encoder 712 encodes the delayed video 708 with the tags and markers in one of the ways described above. The video signal 721 that has been encoded with the tags and markers can then be transmitted, broadcast, sent to a set-top box capable of utilizing the tags and markers data, stored on a video storage device, or otherwise used as desired.

Figure 8:
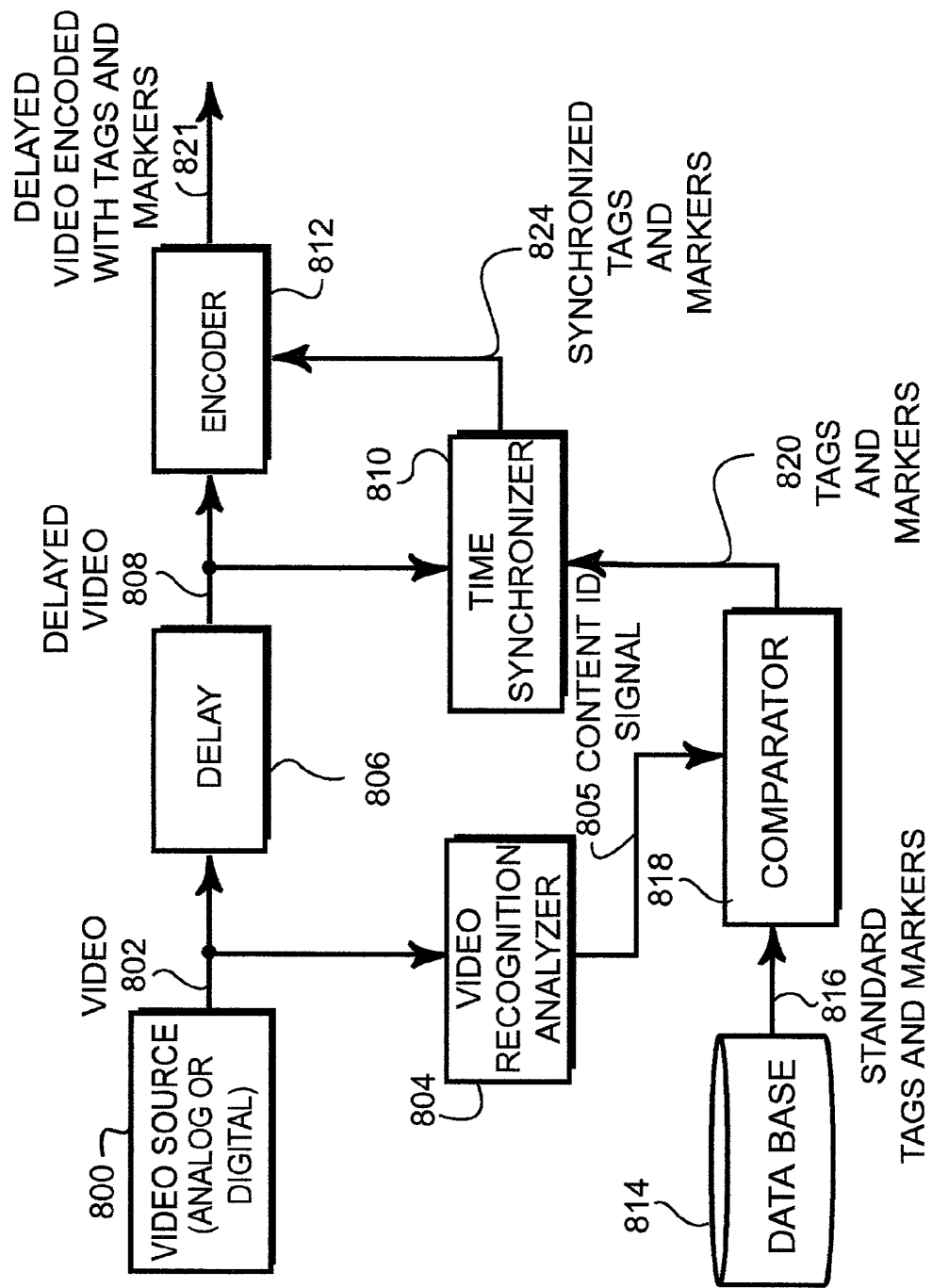
FIG. 8 is a schematic block diagram illustrating one implementation for automatically inserting indicators in a delayed video signal.

FIG. 8 is a schematic block diagram illustrating the manner in which tags and markers can be inserted in a delayed video stream automatically, employing an automated input device. As shown in FIG. 8, a video source 800 produces a video signal 802 that is applied to a video recognition analyzer 804 and a delay device 806. A delay device 806 delays the video signal 802 by a predetermined period which may constitute several seconds or several minutes to produce a delayed video signal 808. The delayed video signal is also applied to an encoder 812.

The video recognition analyzer 804 functions to establish content of the video 802 through a variety of techniques such as rating code, graphic recognition, flesh tones, audio keywords, etc. Once the content of the video has been identified, a content ID signal 805 is sent to a comparator 818. The comparator 818 accesses a database 814 to evaluate the content ID signal 805 and assigns the content to standard tags and markers 816 from the database 814. The tags and markers 820 are then synchronized with the delayed video 808 with time synchronizer 810. The synchronized tags and markers 824 are inserted into the delayed video signal 808 by an encoder 812 and output as delayed video encoded with tags and markers 821.

As described above with regard to FIG. 8, a video recognition analyzer 804 is utilized to identify the content of the video signal 802. The comparator 818 generates tags that may describe the content of the video segment that is being analyzed by the video recognition analyzer 804. This is accomplished by accessing standard tags 816 from the database 814. For example, the tag may indicate the rating of a particular video segment or some descriptive keywords that are provided by the database 814 as standard tags. The comparator applies these tags and markers 820 to the encoder 812 after they are resynchronized with the delayed video 808 by the time synchronizer 810. The delayed video encoded with tags and markers 821 can then be sent to a set-top box that can utilize the tags and markers data, or stored on a video storage device, or otherwise used as desired.

Figure 9:
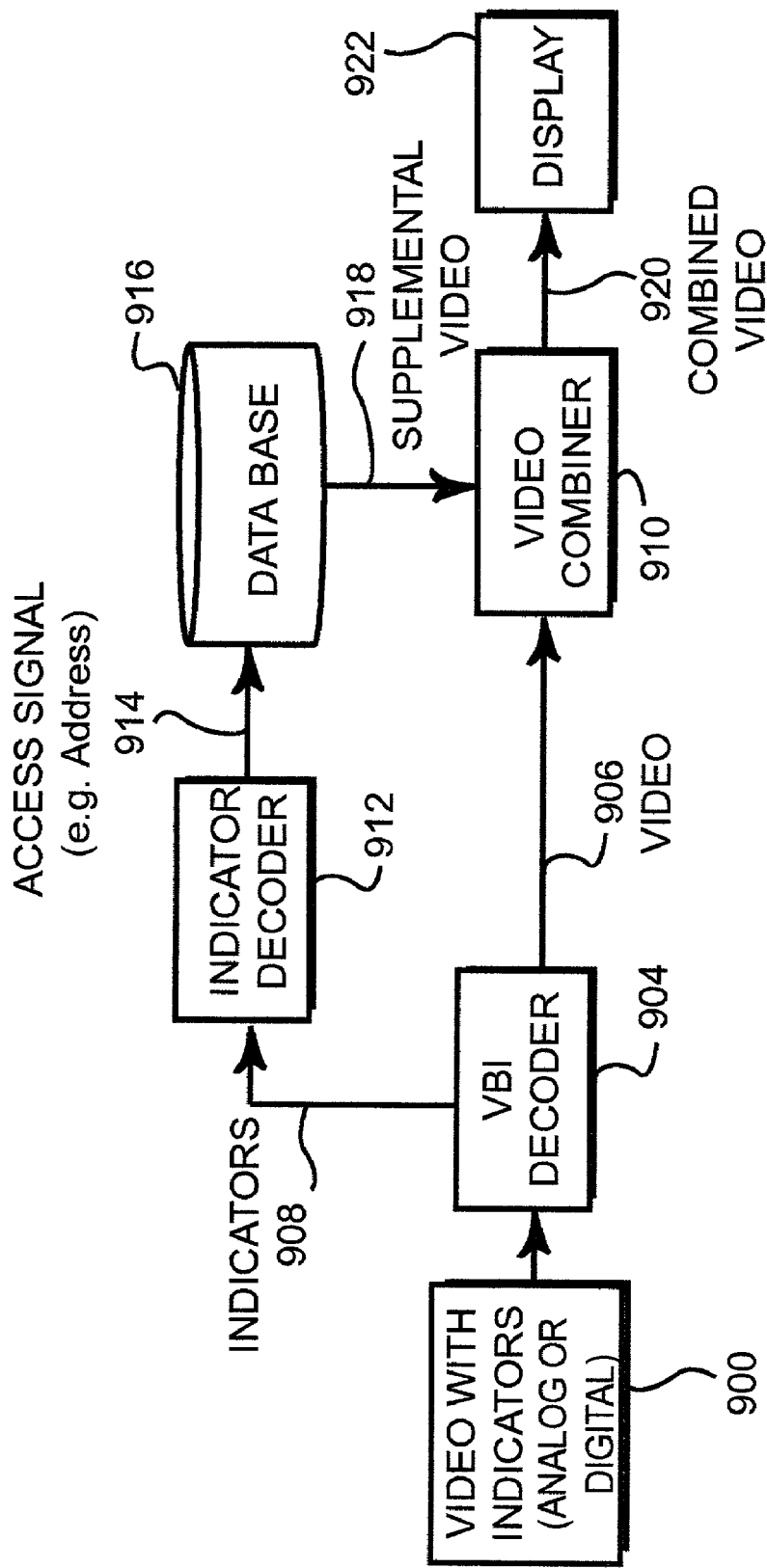
FIG. 9 is a schematic block diagram illustrating one implementation in which a combined video signal can be generated.

FIG. 9 is a schematic block diagram illustrating the manner in which a combined video signal can be generated. The functions performed in accordance with the block diagram illustrated in FIG. 9 can be implemented and performed by the user in a manner such as illustrated in FIG. 7 or at the viewer's location such as in a set-top box as in FIG. 8. As shown in FIG. 9, a video signal 900 that has been encoded with indicators such as tags and markers and may be a signal received by a viewer at the viewer's premises or may be a signal with the tags and markers generated on-site. This on-site generation may be carried out immediately prior to generating a combined video signal, or executed previously and stored on some type of storage media. A video blanking interval decoder 904 separates the indicators 908 from the video signal 906. The video signal 906 is applied to a video combiner 910. The indicators 908 are applied to an indicator decoder 912 that decodes the indicators and generates an access signal 914, such as a database address, in response to the indicator information. The access signal 914 is applied to the database 916 to retrieve a supplemental video signal 918 that is stored at the database address 914 in database 916. The supplemental video signal 918 is applied to the video combiner 910. The video combiner 910 combines the video signal 906 with the supplemental video signal 918 to generate a combined video signal 920. The combined video signal 920 combines the video 906 with the supplemental video 918. The supplemental video 918 can be in the form of an overlay, or the video combiner 910 can partition the screen to display the supplemental video 918 in certain portions of the screen and the video signal 906 on other portions of the screen. This combined video signal 920 is then applied to a display 922 for display for the viewer.

Figure 10:
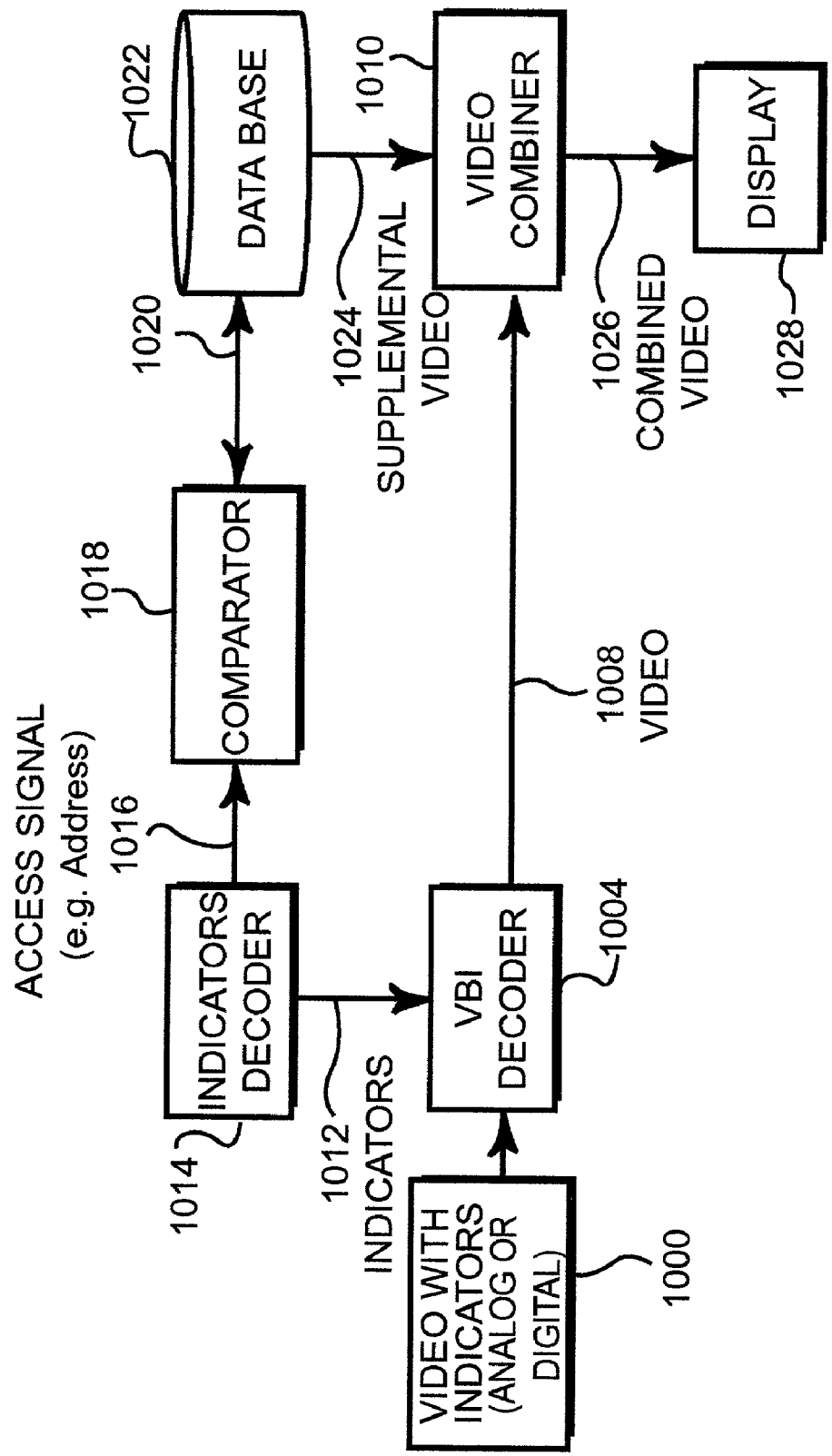
FIG. 10 is a schematic block diagram illustrating another implementation in which a combined video signal can be generated.

FIG. 10 is another embodiment of a system for displaying a combined video signal 1026 that is similar to the implementation illustrated in FIG. 9. As shown in FIG. 10, a video signal 1000 that includes indicators such as tags and markers can be generated by the user in a manner such as illustrated in FIG. 7 or at the viewer's location such as in a set-top box as in FIG. 8. Again, the video signal 1000 that has been encoded with indicators such as tags and markers and may be a signal received by a viewer at the viewer's premises or may be a signal with the tags and markers generated on-site. This on-site generation may be carried out immediately prior to generating a combined video signal, or executed previously and stored on some type of storage media. A video blanking interval decoder 1004 separates the indicators 1012 from the video signal 1008. The video signal 1008 is applied to a video combiner 1010. The indicators 1012 are applied to an indicator decoder 1014. The indicator decoder 1014 generates an access signal 1016 which may comprise an address indicating the location of the supplemental video 1024 in database 1022. The access signal 1016 is applied to a comparator 1018. Database 1022 includes a table that is accessed by the comparator 1018 via connection 1020. The comparator 1018 compares the address information 1016 with the table data stored in database 1022. When a favorable comparison exists, the comparator accesses information located in the database 1022 as indicated by the table (not shown) that is provided in the database 1022. The information accessed in the database 1022 comprises the supplemental video 1024 that is applied to the video combiner 1010. The video combiner 1010 combines the supplemental video 1024 with the video signal 1008 to generate a combined video signal 1026. Again, the supplemental video 1024 may comprise an overlay of the video 1008, or may be displayed on different portions of the display screen. The combined video 1026 can then be applied to the display 1028.

One of the advantages of generating a combined video signal, such as illustrated in FIGS. 9 and 10, is that local advertising can be inserted without requiring that the user have a connection to the Internet, or otherwise be able to generate enhanced video signals. Local advertising can be inserted at the head-end, at the set-top box level, or other local or regional locations. In this manner, national ads can be run by large companies that insert tags and markers that allow local companies to place advertising in the video stream, which can be inserted by the head-end or other local systems. Of course, if local advertising is not desired or available, the tags and markers can be ignored, and the video signal can be displayed full screen. Of course, there are many other applications of the combined video signal. For example, a combined video signal can be used to generate weather alerts or other emergency information, display sports scores, provide various regional information, provide selective alternative video clips, etc.

Figure 11:
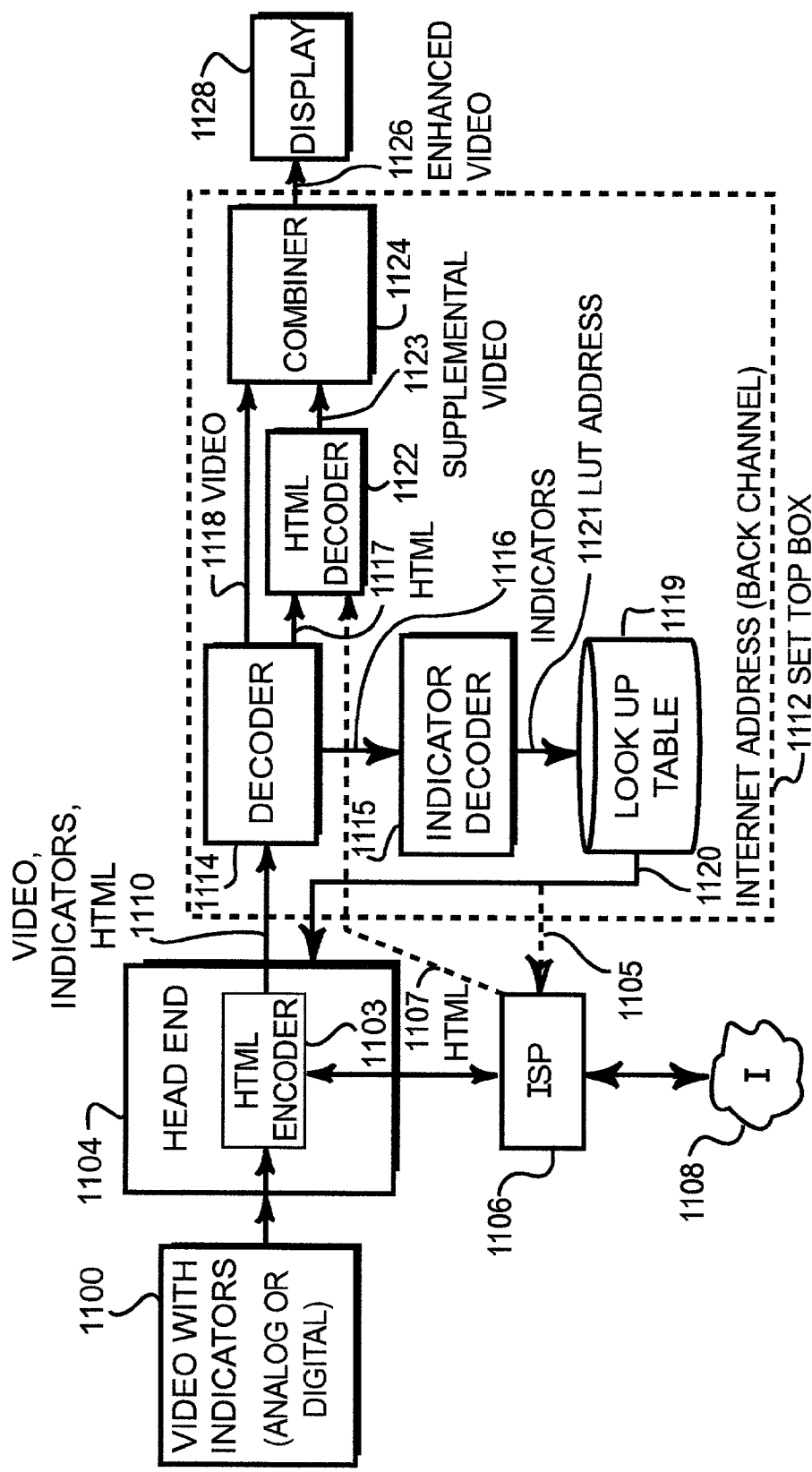
FIG. 11 is a schematic block diagram illustrating the manner in which the present invention can be used to generate an enhanced video signal.

FIG. 11 is a schematic block diagram of a system that generates an enhanced video signal 1126 by accessing an Internet connection in response to indicators that are provided on a video signal. As shown in FIG. 11, a broadcast signal 1100, which includes video and indicators such as tags and markers, may be received by a head-end 1104 from a variety of sources. This signal may be received from broadcast or cable transmission, a satellite downlink, a microwave transmission, etc. The indicators such as tags and markers may be a signal received by a viewer at the viewer's premises or the tags and markers may be generated on-site. This on-site generation may be carried out immediately prior to generating a combined video signal, or executed previously and stored on some type of storage media. The head-end 1104 transmits the indicators by a way of cable 1110 to a set-top box 1112. A HTML signal is also included in the transmission signal 1110 whenever an ISP 1106 accesses an Internet address by way of Internet 1108, as explained in more detail below. The signal 1110 is transmitted to a decoder 1114 that decodes and separates the indicators 1116 and applies the indicators to an indicator decoder 1115. For example, the decoder 1114 may extract the indicators from the vertical blanking interval. The HTML signal 1117 is also extracted from the signal 1110 and applied to the HTML decoder 1122. The video signal 1118 that is separated from the HTML signal 1117 and the indicators 1116 is applied to combiner 1124.

Referring again to FIG. 11, the indicators 1116 are used to encode an Internet address for generating an enhanced video signal 1126. Indicator decoder 1115 decodes the indicator signal to generate a look-up table address 1121 that is applied to look-up table 1119. Look-up table 1119 generates an Internet address signal 1120 that is stored at the look-up table address 1121. The Internet address signal 1120 is transmitted back to the head-end through, for example, a back channel, or alternatively is sent directly to an Internet service provider (ISP) 1106 via Internet connection 1105. When the head-end receives the Internet address information 1120, the head-end 1104 transmits this information to an Internet service provider 1106 that is connected to the Internet 1108. The Internet service provider provides the HTML web page information back to the head-end 1104 to an HTML encoder 1103 that encodes the video signal with the HTML information. The HTML information is transmitted with the video signal and indicators on connection 1110 to decoder 1114. Alternatively, the ISP 1106 transmits the HTML signal through an Internet connection 1107 directly to HTML decoder 1122 in set-top box 1112.

As also shown in FIG. 11, the decoder 1114 separates the HTML signal 1117 from the video signal 1118. The HTML signal 1117 is transmitted to the HTML decoder 1122. The HTML decoder 1122 decodes the HTML signal 1117, or HTML signal 1107, and generates a supplemental video signal 1123 that is applied to combiner 1124. The combiner 1124 receives the video signal 1118 and the supplemental video signal 1123 and generates an enhanced video signal 1126. The combiner 1124 may combine the supplemental video signal 1123 as an overlay to the video signal 1118, or may partition the screen so that each of these signals appear in different portions of the screen of the enhanced video signal 1126. The enhanced video signal 1126 is then displayed on a display 1128 such as a television.

The advantages of a system, such as illustrated in FIG. 11, are that video tags and markers can be used to access Internet addresses to provide an enhanced video signal 1126. For example, a national advertisement may be run by a national sales company in which indicators are inserted to access local web pages for local dealers of the national company. Local dealers can then provide information on location, prices, and availability of certain products. Further, the head-end device 1104 may insert the tags and markers according to regions and locations serviced by that head-end. In this fashion, dealers can carefully select the locale of the customers for which the dealers want to provide this type of information.

The present invention therefore provides various systems for inserting indicators to generate control signals to control the display of information, such as the generation of combined video signals or the generation of enhanced video signals. Of course, the control signals can be used for any desired purpose including advertising, emergency messages, games to play along with a video broadcast, rating selections, exclusion of content, selection of content, etc. Tags and markers can be inserted in an automated fashion using a database, or manually with a user input station. Video can be encoded using a time code from a time encoded video stream or from a separate time code generator. A comparator can be used that compares the time code signal with a table stored in the database to access tags and markers stored in the database. Alternatively, tags and markers can be used to generate addresses that access a database that functions like a look-up table to generate the tags and markers or supplemental video signals. Supplemental video signals can be used to generate a combined video signal that is displayed as either an overlay or as a partitioned area of the display screen. The supplemental video signal can be used in applications where enhanced video is not available to the user. In this fashion, information such as local advertising, banner ads, local sports scores, local weather conditions, or any supplemental information that may vary from region to region may be provided to viewers who do not have enhanced video capabilities.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of generating and inserting indicators into a video stream, said method comprising:

generating a time code signal that is synchronized with the video stream;

applying the time code signal to an address generator that decodes the time code signal and generates a corresponding address signal;

applying the corresponding address signal to a database, said database storing a plurality of indicators;

accessing a set of indicators that are stored in said database using said address signal as an address into said database; and encoding said video stream with said set of indicators accessed from said database using said address signal.

2. The method as set forth in claim 1 wherein said step of encoding said video stream with indicators comprises encoding said video stream with content indication tags.

3. The method as set forth in claim 1 wherein said step of encoding said video stream with indicators comprises encoding said video stream with segment division markers.

4. The method as set forth in claim 1 wherein said step of encoding said video stream with said set of indicators is performed using a vertical blanking interval encoder.

5. A system for encoding a video stream with indicators, said system comprising:

a time code generator that generates a time code signal that is synchronized with the video stream;

an address generator that receives the time code signal, decodes the time code signal, and generates a corresponding address signal;

a database, said database having said indicators stored therein, said database receiving the corresponding address signal and generating an indicator signal in response to said corresponding address signal; and an encoder that encodes said video stream with said indicator signal to generate a video stream encoded with said indicators.

6. The system as set forth in claim 5 wherein said indicators are content indication tags.

7. The system as set forth in claim 5 wherein said indicators are segment division markers.

8. The method as set forth in claim 1 wherein said step of encoding said video stream with said set of indicators is performed using a horizontal blanking interval encoder.

9. The method as set forth in claim 1 wherein said step of encoding said video stream with said set of indicators is performed using a back channel encoding techniques.

10. The method as set forth in claim 1 wherein said step of encoding said video stream with said set of indicators is performed by encoding said set of indicators within a digital video stream.

11. The method as set forth in claim 10 wherein said set of indicators are identified in said digital video stream using a data program identification (PID).

12. The method as set forth in claim 1 wherein said step of encoding said video stream with indicators comprises encoding XML code within said video stream.

13. The method as set forth in claim 1 wherein said step of encoding said video stream with indicators comprises encoding a trigger to generate an enhanced video signal within said video stream.

14. The method as set forth in claim 1 wherein said step of encoding said video stream with indicators comprises encoding a trigger to access Internet address within said video stream.

15. The system as set forth in claim 5 wherein said encoder comprises a horizontal blanking interval encoder.

16. The system as set forth in claim 5 wherein said encoder uses back channel encoding techniques.

17. The system as set forth in claim 5 wherein said encoder encodes encoding said set of indicators within a digital video stream.

18. The system as set forth in claim 17 wherein said set of indicators are identified in said digital video stream using a data program identification (PID).

19. The system as set forth in claim 5 wherein said encoder encodes XML code within said video stream.

20. The system as set forth in claim 5 wherein said encoder encodes a trigger to generate an enhanced video signal within said video stream.

21. The method as set forth in claim 5 wherein said encoder encodes a trigger to access Internet address within said video stream.

22. The system as set forth in claim 5 wherein said encoder comprises a vertical blanking interval encoder.

* * * * *

UNITED STATES PATENT AND TRADEMARK OFFICE
CERTIFICATE OF CORRECTION

PATENT NO. : 7,421,729 B2 Page 1 of 1
APPLICATION NO. : 10/076950
DATED : September 2, 2008
INVENTOR(S) : Zenoni It is certified that error appears in the above-identified patent and that said Letters Patent is hereby corrected as shown below:

In column 1, lines 8-16, delete "This application claims the benefit from the U.S. Provisional Application Ser. No. 60/227,890, entitled "iSelect Video", filed Aug. 25, 2000, by Peliotis, et al., and U.S. Nonprovisional application Ser. No. 09/933,928, entitled "iSelect Video", filed Aug. 21, 2001, by Peliotis, et al., and U.S. Provisional Application Ser. No. 60/268,350, entitled "Video Tags and Markers", filed Feb. 12, 2001, by Zenoni, all of which are specifically incorporated herein by reference for all that they disclose and teach."
and insert -- This application is based upon and claims the benefit of United States provisional application number 60/268,350, entitled "VIDEO TAGS AND MARKERS", filed February 12, 2001; and is a continuation-in-part of United States non-provisional application serial number 09/933,928, entitled "iSELECT VIDEO", filed August 21, 2001, which is based upon and claims the benefit of United States provisional application number 60/227,890 filed August 25, 2000, having the same title. In addition, the entire content of the above referenced applications are specifically incorporated herein by reference for all that they disclose and teach. --, therefor.

Signed and Sealed this

Ninth Day of December, 2008

JON W. DUDAS
*Director of the United States Patent and Trademark Office*